UNITED STATES PATENT OFFICE.

JULIUS TANNE, OF ROZNIATOW, AUSTRIA-HUNGARY, ASSIGNOR OF ONE-HALF TO GUSTAVE OBERLÄNDER, OF BERLIN, GERMANY.

PROCESS OF MANUFACTURING PARAFFIN.

1,019,102.      Specification of Letters Patent.      Patented Mar. 5, 1912.

No Drawing.      Application filed December 2, 1909. Serial No. 530,999.

*To all whom it may concern:*

Be it known that I, JULIUS TANNE, a subject of the Austro-Hungarian Emperor, and resident of Rozniatow, Galicia, Austria-Hungary, have invented certain new and useful Improvements in Processes of Manufacturing Paraffin, of which the following is a specification.

This invention relates to processes of manufacturing paraffin, and has for its object to accomplish the complete separation of the solid hydrocarbons (paraffin, etc.) contained in various admixtures, such as the residues from the distillation of mineral oil, the tarry residues obtained from the distillation processes applied to wood, peat, soft coal or bituminous slate, and also such as ozokerite, ceresin, and like products.

It is well known that paraffin possesses a collodial reaction against solvents, (Conf. Jacobson, *Repertorium*, 1890, 2, pages 33 and 34). For instance in heated solutions made with benzene, chloroform, bisulfid of carbon or turpentine-oil, the paraffin after cooling separates out and forms a gelatinous, colloidal precipitate having a flaky appearance. This colloidal condition prevents part of the paraffin which should be easily crystallized from being separated, and this fact explains the small yield of solid hydrocarbons which is frequently obtained when an exact chemical determination of the paraffin in the raw materials will show it to present in a considerably greater amount. With acetic acid, and particularly glacial acetic acid, paraffins, on the contrary have a crystalloidal reaction and from this solvent, dissolved paraffin is, upon cooling, separated in small scales or sheets which are easily and perfectly separated from the solvent.

By experiment it has been ascertained that a solution of glacial acetic acid in benzene acts in the same way as the pure glacial acetic acid. If a residue from petroleum, or a tar obtained by distillation from wood, peat, soft coal or bituminous slate, from either of which all water has been removed, is slowly heated and dissolved in benzene containing from 5 to 10 per cent. of glacial acetic acid, the paraffin, after the solution has cooled, separates out in the form of a fine grained sediment. This separation is accelerated by cooling in a refrigerator.

Owing to the difference in the raw materials to be treated, the quantity of glacial acetic acid to be dissolved in the benzene may advantageously vary, from about 5 to 10 per cent. of the total mixture, and this amount must be ascertained by an experiment on a small scale.

A specific embodiment of my invention is as follows: For example, 100 kgs. of petroleum residues may be dissolved in at least half the quantity of benzene containing 10 per cent. of glacial acetic acid, while being slowly heated. The quantity of the solvent depends on the consistency of the material and if the consistency is great, equal parts of material and solvent must be used. The solution is allowed to cool quite gradually and after twelve hours it is put into a refrigerator. After about forty-eight hours the separation is complete and the separated fine grained pulp is subjected to pressure; and the pressed paraffin is further treated and refined according to the known processes. The mother liquor is neutralized by an alkali, and an acetate is formed (acetate of lime for instance) when lime has been used; the benzene is distilled off from this solution, and after the separation of the acetate, the residue may be utilized for lubricating oils.

The above described acetic acid-benzene process has the advantage over the processes hitherto in use in that the raw material can be better utilized, that a great deal of time may be saved in the manufacture, and the yield of hard paraffin is considerably increased.

What I claim is:—

1. In the manufacture of paraffin, the process which comprises extracting material containing paraffin with a solution of acetic acid in benzene and recovering granular paraffin by cooling the solution formed in the extraction.

2. The process of separating solid hydrocarbons from materials containing the same which consists in extracting said materials by benzene containing an admixture of from 5 to 10 per cent. of acetic acid, cooling the solution obtained in a refrigerator, separating the precipitate obtained, and pressing the same.

3. The process of separating solid hydrocarbons from materials containing the same, which comprises treating such materials with a solution of acetic acid in benzene, and refining the precipitate formed.

In testimony whereof I have signed my name to this specification in the presence of two subscribing witnesses.

JULIUS TANNE.

Witnesses:
   HENRY HASPER,
   WOLDEMAR HAUPT.